United States Patent [19]

Takanashi et al.

[11] Patent Number: 5,313,322

[45] Date of Patent: May 17, 1994

[54] METHOD OF PRODUCING LIQUID CRYSTAL DISPLAY DEVICE INCLUDING DEGASSING SUBSTRATES BEFORE FORMING ELECTRODE, SEALING, OR INJECTING LIQUID CRYSTAL

[75] Inventors: Hiroshi Takanashi, Souraku; Shunsei Fukuchi, Nara; Kenji Misono, Nara; Makoto Iwamoto, Yamatokoriyama, all of Japan

[73] Assignee: Sharp Kabushiki Kaisha, Osaka, Japan

[21] Appl. No.: 967,702

[22] Filed: Oct. 28, 1992

[30] Foreign Application Priority Data

Oct. 28, 1991 [JP] Japan .................... 3-309880

[51] Int. Cl.$^5$ ............... G02F 1/1333; G02F 1/1335; G02F 1/13339
[52] U.S. Cl. ......................... 359/82; 359/62; 359/80
[58] Field of Search ............... 359/62, 80, 82

[56] References Cited

U.S. PATENT DOCUMENTS

| | | | |
|---|---|---|---|
| 4,699,471 | 10/1987 | Miyake et al. | 359/275 |
| 4,832,467 | 5/1989 | Miyagi et al. | 359/273 |
| 5,020,883 | 6/1991 | Era et al. | 359/80 |
| 5,208,080 | 5/1993 | Gajewski et al. | 359/62 |

FOREIGN PATENT DOCUMENTS

| | | | |
|---|---|---|---|
| 57-139720 | 8/1982 | Japan | 359/62 |
| 62-299939 | 12/1987 | Japan | 359/62 |
| 64-91112 | 4/1989 | Japan | 359/62 |

OTHER PUBLICATIONS

Abstract of JP 60-8826 published Jan. 17, 1985.

*Primary Examiner*—Anita P. Gross
*Attorney, Agent, or Firm*—David G. Conlin; George W. Neuner

[57] ABSTRACT

A method of producing a liquid crystal display device comprising the steps of opposing two substrates, which are composed of a transparent electrode formed on a plastic substrate, with a specified space therebetween, sealing the circumferential ends of the substrates with a sealant so as to form a sealed space, and injecting a liquid crystal to the sealed space, wherein a degassing treatment is conducted by heating each of the substrates or the sealed substrates in a vacuum atmosphere to release gas adsorbed on the surface of the substrates prior to the step of forming the transparent electrode, the sealing step or the injection step of the liquid crystal.

8 Claims, 3 Drawing Sheets

METHOD OF PRODUCING LIQUID CRYSTAL DISPLAY DEVICE INCLUDING DEGASSING SUBSTRATES BEFORE FORMING ELECTRODE, SEALING, OR INJECTING LIQUID CRYSTAL

BACKGROUND OF THE INVENTION

1. Field of the Invention

The present invention relates to a method of producing a liquid crystal display device which is flat and light-weight for use in a notebook-type or palm-top type personal computer, word processor, electronic datebook or the like.

2. Description of the Invention

Conventionally, a flat and lightweight liquid crystal display device has used substrates consisting of transparent electrodes formed on glass substrates.

In recent years, however, there has been a rising demand for a flatter and lighter-weight liquid crystal display device for use in a notebook-type or palm-top type personal computer, word processor, electronic datebook or the like. In order to meet the demand, a liquid crystal display device which uses substrates consisting of transparent electrodes formed on plastic substrates has been proposed.

However, the foregoing conventional device which uses the substrates consisting of the transparent electrodes formed on the plastic substrates is disadvantageous in that the gas adsorbed on the surfaces of the plastic substrates is not treated and causes undesirable effects such as reduction in production yield and reliability.

The plastic substrate is composed of a plastic plate or film of acrylic, epoxy, polyethylene, or polycarbonate type, but if viewed microscopically, these materials have a sponge-like structure with an adsorptive property for gas and water. Consequently, if gas (including water vapor) adsorbed on the surface of the plastic substrate is released by a heating treatment in the production processes, it brings about such disadvantages as changed conditions for subsequent treatments and the development of bubbles.

For example, when the transparent electrode is to be formed on the plastic substrate by sputtering or vapor deposition in the electrode forming treatment, it is necessary to heat the substrate to a high temperature in a high-vacuum atmosphere. In this case, however, it is extremely difficult to obtain a high vacuum, compared with the case in which a glass substrate is used, so that a transparent electrode having an excellent strength and adherence to the substrate cannot be formed. The resulting transparent electrode is disadvantageous in that cracks, peeling off the substrate, flaws and breakage of wires are easy to occur therein.

The reason for not attaining a high vacuum can be attributed to the fact that gas and water (water vapor), which were adsorbed on the surface of the plastic substrate in a wet washing or like process, are released in a vacuum atmosphere by the application of heat.

Through an etching process prior to a seal printing treatment in which a sealant is printed on the electrode substrates and a washing process after the treatment of forming orientation films, the surfaces of the plastic substrates have adsorbed a plenty of water and gas, which in turn are released in the sealant by a thermosetting treatment (the application of pressure and heat) conducted after the sealant is printed and attached onto the plastic substrate, resulting in bubbles in the sealant.

These bubbles in the sealant reduce not only the sealing strength but also airtightness of the sealant by causing bulk destruction of the sealant. As a result, bubbles are also mixed in the layer of a liquid crystal when the liquid crystal is injected by a vacuum impregnating injection method, thereby significantly reducing the reliability and weatherproofness of the device.

Moreover, while the evacuation conducted in the injection of a liquid crystal provides a sufficient degassing effect with a glass substrate, it does not provide a sufficient degassing effect with a plastic substrate, resulting in the undesirable development of bubbles after the injection of the liquid crystal. With a large-scale liquid crystal display device in the order of 10 cm by 15 cm, in particular, bubbles are always produced in the liquid crystal layer.

The object of the present invention, which was conducted in view of the above-mentioned circumstances, is to provide a method of producing a liquid crystal display device with which the reduction in production yield and reliability resulting from the gas adsorbed on the surfaces of the plastic substrates can be prevented.

SUMMARY OF THE INVENTION

The present invention provides a method of producing a liquid crystal display device comprising the steps of opposing two substrates, which are composed of a transparent electrode formed on a plastic substrate, with a specified space therebetween, sealing the circumferential ends of the substrates with a sealant so as to form a sealed space, and injecting a liquid crystal to the sealed space, wherein a degassing treatment is conducted by heating each of the substrates or the sealed substrates in a vacuum atmosphere to release gas absorbed on the surface of the plastic substrate prior to the step of forming the transparent electrode, the sealing step or the injection step of the liquid crystal.

As described above, the method according to the present invention is constituted so that, in a liquid crystal display device using a plastic substrate, a specific degassing treatment is performed at a specific stage so as to release the gas adsorbed on the surface of the plastic substrate, thereby preventing the reduction in production yield and reliability resulting from the gas adsorbed on the surfaces of the plastic substrates.

DETAILED DESCRIPTION OF THE PREFERRED EMBODIMENTS

According to the production method of the present invention, a plastic substrate is heated in a vacuum atmosphere to release the gas adsorbed on the surface thereof just before the formation of transparent electrodes, so that a high vacuum can easily be obtained similarly in the case using glass substrates and that a transparent electrode with an excellent strength and adherence to the substrate can be formed.

If the substrate is heated in a vacuum atmosphere just before the sealing treatment with a sealant so as to release the adsorbed gas from the surface of the substrate, bubbles will not be released in the sealant in the sealing treatment. Consequently, the reduction in sealing strength caused by the bubbles in the sealant and the reduction in airtightness caused by the bulk destruction of the sealant do not occur, so that bubbles are not allowed to mix in the liquid crystal layer which is formed by the vacuum impregnating injection method and that reliability and weatherproofness of the device are not reduced.

In the degassing treatment of the present invention, it shall be understood that the substrate is heated maintaining a vacuum atmosphere, and firstly heated under normal pressure and then subjected in a vacuum atmosphere.

Figure 1:
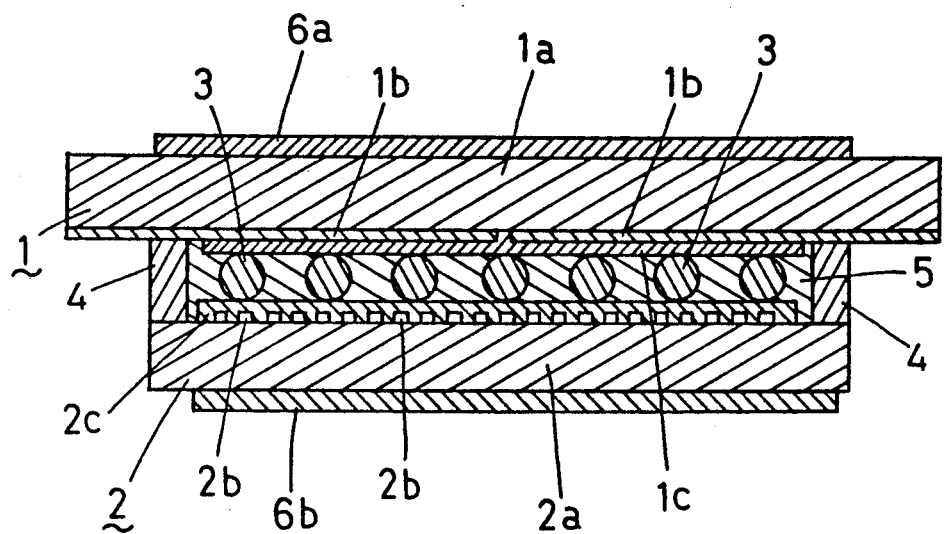
FIG. 1 is a cross sectional view showing a liquid crystal display device according to an embodiment of the present invention.

FIG. 1 shows an embodiment of the liquid crystal display device according to the present invention, in which upper and lower substrates 1 and 2 are made by forming transparent electrodes 1b and 2b of indium oxide on plastic substrates 1a and 2a of acrylic resin type by sputtering or vapor deposition and then depositing orientation films 1c and 2c over the transparent electrodes 1b and 2b.

The two substrates 1 and 2 thus obtained are opposed to each other, properly spaced by bead-like spacers 3. The circumferential ends of the substrates 1 and 2 are hermetically sealed with a thermo-setting sealant 4 so as to form a sealed space in which a liquid crystal 5 is injected by the vacuum impregnating injection method. The outer surfaces of the substrates 1 and 2 are provided with polarizing plates 6a and 6b.

Preferably, the plastic substrates 1a and 2a are heated in an evacuated atmosphere to release the adsorbed gas from their surfaces just before the electrode forming treatment an then the transparent electrodes 1b and 2b are formed on the degassed plastic substrates 1a and 2b by sputtering or vapor deposition.

The substrates 1a and 2a are heated in the degassing treatment for 1 to 2 hours at a temperature approximately 20° C. higher than a temperature at which the substrates are heated in the electrode forming treatment (In case that the substrates are heated at a temperature of 100° to 120° C. in the electrode forming treatment, the temperature at which the plastic substrates 1a and 2a are heated in the degassing treatment is set at 130° to 140° C.).

For example, if the transparent electrodes 1b and 2b are formed on the plastic substrates 1a and 2a of acrylic resin type with the thickness of 0.4 mm by sputtering indium oxide in a vacuum atmosphere ($2 \times 10^{-5}$ Torr or less), the substrate are heated at 140° C. for 1.5 hours in the degassing treatment prior to the sputtering, the evacuation for the sputtering is started at the substrate temperature of 130° C., and the sputtering is conducted at the substrate temperature of 120° C. after a specific degree of vacuum is attained, so as to perform the degassing treatment by a 20° C. difference in temperature. This allows the evacuation for the sputtering and the degassing treatment to be conducted sequentially, thereby simplifying the evacuation process.

As described above, the plastic substrates 1a and 2a are heated so as to release the adsorbed gas in an evacuated atmosphere from the surfaces of th substrates just before the transparent electrodes 1b and 2b are formed by sputtering, vapor deposition, or the like. Consequently, even when the plastic substrates 1a and 2a are used, a high vacuum can easily be obtained similarly in the case using glass substrates so that the transparent electrodes 1b and 2b with an excellent strength and adherence to the substrates can be formed.

Furthermore, the degassing treatment can be conducted more reliably and easily by conducting a specific electrode forming treatment after heating the plastic substrates 1a and 2a at a temperature higher than the temperature at which the substrates are heated in the electrode forming treatment.

FIGS. 2 to 5 are views respectively illustrating the steps of joining the electrodes 1 and 2 with the use of the thermosetting sealant 4.

Figure 2:
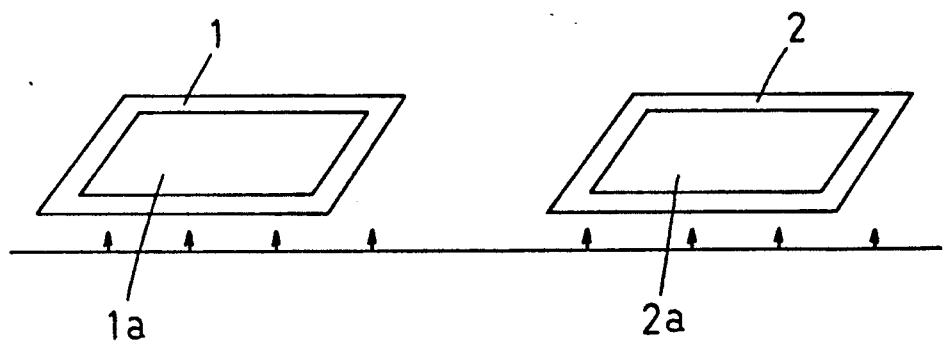
FIG. 2 is a view showing a heat treatment step in the method of producing the liquid crystal display device.
Figure 3:
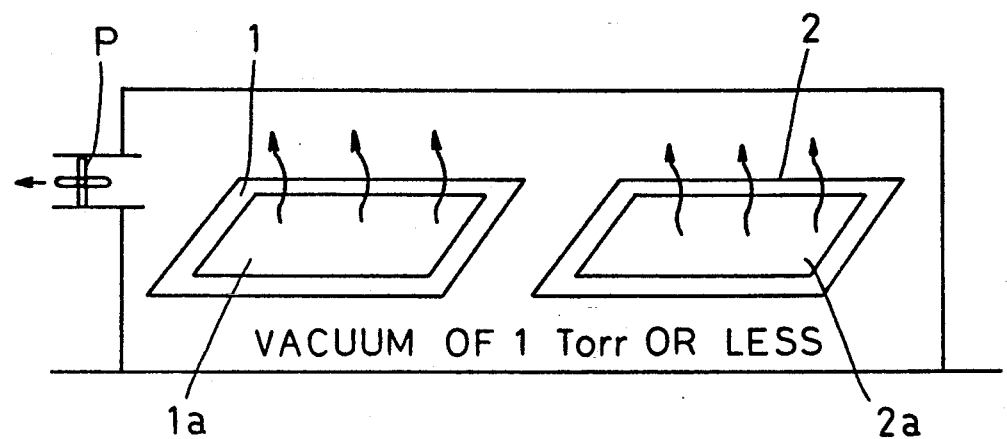
FIG. 3 is a view showing a degassing treatment in the method of producing the liquid crystal display device.

As shown in FIG. 2, the common substrate 1 and the segment substrate 2 are heated for about two hours at a temperature (110° C.) higher than the boiling point of water in the environment (1 atm) in which the seal printing treatment is to be conducted immediately thereafter so as to print the sealant 4 for joining the substrates 1 and 2 on which the transparent electrodes 1b and 2b and the orientation films 1c and 2c formed. Subsequently, as shown in FIG. 3, the substrates 1 and 2 are immediately transferred to the atmosphere which is evacuated by a vacuum pump P (1 Torr or less) so that the adsorbed gas is released from the surfaces of the plastic substrates 1a and 2a in the degassing treatment which lasts about four hours. Since the evacuation is conducted after the adsorbed gas and water are liberated by heating the plastic substrates 1a and 2a at a temperature higher than the aforesaid boiling point of water, the degassing treatment can be carried out in a shorter period of time.

Figure 4:
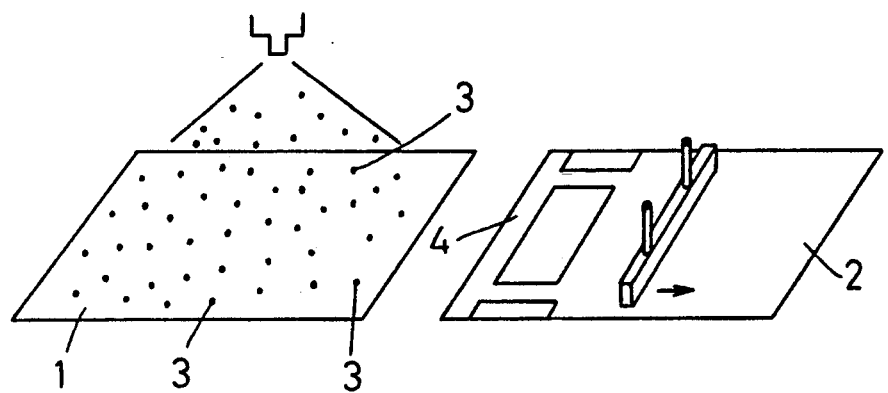
FIG. 4 is a view showing a step of providing spacers and a sealant.
Figure 5:
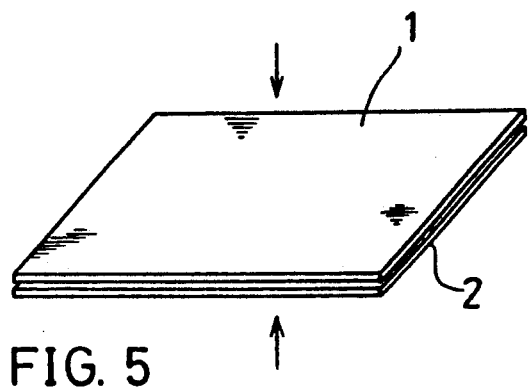
FIG. 5 is a view showing a step of joining both electrodes.

Next, as shown in FIG. 4, the bead-like spacers 3 are placed on the common substrate 1 by a sprinkling method and the sealant 4 is printed in a pattern on the segment substrate 2. Then, as shown in FIG. 5, the substrates 1 and 2 are stacked and joined, followed by the application of pressure (0.5 to 2.0 Kgf/cm$^2$) and heat (130° to 170° C.) so as to thermally set the sealant 4.

As described above, the water and gas adsorbed on the surfaces of the plastic substrates 1a and 2a of the substrates 1 and 2 are released prior to the seal printing treatment in which the sealant 4 is printed and to the joining of the substrates 1 and 2, followed by the thermosetting treatment, so that the gas adsorbed on the surfaces of the plastic substrates 1a and 2a are not released in the sealant 4. Consequently, the reduction in sealing strength caused by the bubbles in the sealant 4 and the reduction in airtightness caused by the bulk destruction of the sealant 4 do not occur. Moreover, bubbles are not allowed to mix in the liquid crystal layer which is formed by injecting the liquid crystal to the sealed space by the vacuum impregnating injection method, thereby constantly providing a large-scale liquid crystal display device with high display quality without reducing the reliability and weatherproofness of the device.

Figure 6:
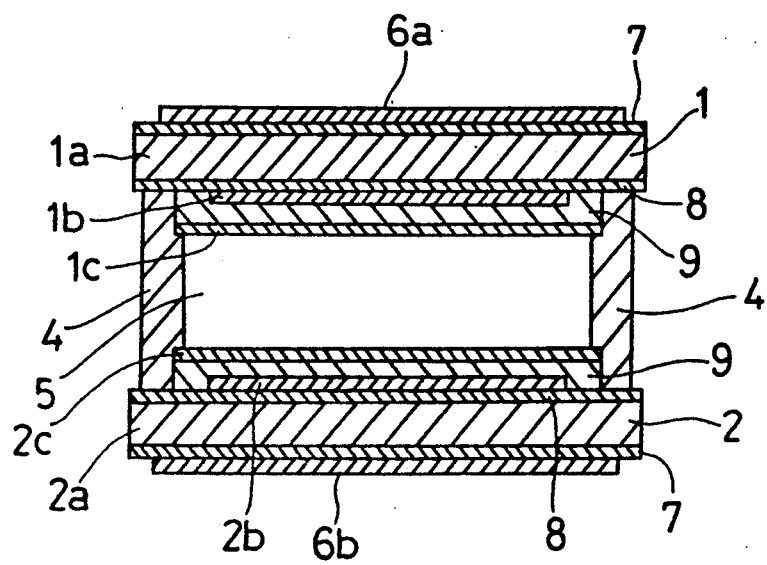
FIG. 6 is a cross sectional view showing a liquid crystal display device according to another embodiment of the present invention.
Figure 7:
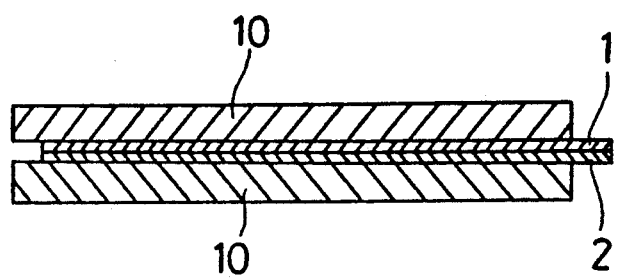
FIG. 7 is a view partially illustrating the processes of producing the liquid crystal display device.

FIG. 6 is a cross sectional view showing another embodiment which is composed of the constitution of the embodiment shown in FIG. 1 with a hard coat 7, under coat 8, and top coat 9 added thereto. The basic constitution and display operation are the same as those of the aforesaid embodiment. FIG. 7 is a view illustrating the degassing treatment conducted just before the injection of a liquid crystal, in which the substrates 1 and 2 of the liquid crystal display device before the injection of the liquid crystal are held from the outside by a glass holding jig 10 and subjected to heating in an evacuated atmosphere so as to release the gas and water adsorbed on the surfaces of the substrates 1 and 2 and sealant 4.

The plastic substrates 1a and 2a of epoxy resin type are used here and the degassing treatment is conducted by heating at 130° C. for 30 minutes in a vacuum of 1 Torr and the evaluation is conducted for 1 hour to attain $5 \times 10^{-3}$ Torr in the injection of the liquid crystal. The generation of bubbles was checked by changing the degassing conditions (the evaluation of bubbles conducted after the heating at 130° for 30 minutes, followed by gradual cooling) with the conclusion as follows; that is, if the degassing treatment is conducted without conducting the heating treatment, the evacuation for 50 hours is required to prevent the generation of bubbles, so that it is difficult to introduce the liquid crystal injecting treatment to mass production processes. However, the evacuation time can be reduced to 4 hours by conducting the heating treatment, which facilitates the introduction of the liquid crystal injecting treatment to mass production processes. Needless to say, the heating and evacuation can be conducted at the same time.

The same effects can be obtained in case the plastic substrates 1a and 2a of acrylic resin type, PES, PET, or ADC are used. Though the holding jig 10 used in the embodiment is made of glass, it can also be made of plastic or metal.

As described above, the liquid crystal display device is heated in an evacuated atmosphere just before the injection of the liquid crystal so as to perform the degassing treatment in which the adsorbed gas is released from the surfaces of the substrates 1 and 2 and sealant 4.

Consequently, the development of bubbles in the liquid crystal layer can be prevented even when a large-scale liquid crystal display device is formed, resulting in the improved display quality and reliability. Moreover, since the holding jig 10 is used for holding the substrates 1 and 2 from the outside, the deformation of the plastic substrates 1a and 2a caused by external forces in the heat treatment and in the degassing treatment by evacuation can surely be prevented. Moreover, since the evacuation and the heat treatment are simultaneously used in the degassing treatment, the adsorbed gas can be released in a shorter time. Furthermore, the evacuation in the degassing treatment is sequentially followed by the evacuation process in the subsequent injecting treatment, so that the reduction of the treatment time and the simplification of the manufacturing facilities can be attained.

As described above, the method according to the present invention is constituted so that, in a liquid crystal display device using plastic substrates, specific treatments are performed after releasing the gas adsorbed on the surfaces of the plastic substrates by the degassing treatment, thereby preventing the reduction in production yield and reliability caused by the gas adsorbed on the surfaces of the plastic substrates.

In an embodiment of the present invention, the said plastic substrates are heated in a vacuum atmosphere to release the gas adsorbed on the surfaces thereof just before the formation of the transparent electrodes by sputtering, vapor deposition, or the like, so that a high vacuum can easily be obtained similarly in the case using glass substrates and that transparent electrodes with an excellent strength and adherence to the substrates can be formed.

Furthermore, the degassing treatment can be conducted more reliably and easily by conducting a specific electrode forming treatment after heating the plastic substrates at a temperature higher than the temperature at which the substrates are heated in the electrode forming treatment.

In another embodiment of the present invention, the substrates are heated to a temperature higher than the boiling point of water in the environment in which the sealing treatment with the sealant is to be conducted immediately thereafter so as to conduct the degassing treatment in which the adsorbed water and gas are released from the surfaces of the plastic substrates prior to the seal printing, followed by the hermetical sealing of the substrates with the sealant.

As a result, the gas adsorbed on the surfaces of the plastic substrates is not released in the sealant, and the reduction in sealing strength caused by the bubbles in the sealant and the reduction in airtightness caused by the bulk destruction of the sealant do not occur. The bubbles are not allowed to mix in the liquid crystal layer which is formed by the vacuum impregnating injection method, so that the reliability and weatherproofness of the liquid crystal display device are not reduced.

In a further embodiment of the present invention, the liquid crystal display device is heated in an evacuated atmosphere just before the injection of the liquid crystal so as to perform the degassing treatment in which the adsorbed gas is released from the surfaces of the substrates and sealant, thereby preventing the development of bubbles in the liquid crystal layer even when a large-scale liquid crystal display device is formed.

If the holding jig for holding the substrates from the outside is used to prevent the deformation of the substrates, the deformation of the substrates in the heating and in the degassing treatment by evacuation can surely be prevented.

What is claimed is:

1. A method of producing a liquid crystal display device comprising the steps of opposing two substrates, which are composed of a transparent electrode formed on a plastic substrate, with a specified space therebetween, sealing the circumferential ends of the substrates with a sealant so as to form a sealed space, and injecting a liquid crystal to the sealed space, wherein a degassing treatment is conducted by heating each of the plastic substrates in a vacuum atmosphere to release gas adsorbed on the surface of the plastic substrate prior to either the step of forming the electrodes or the sealing step.

2. A method of producing a liquid crystal display device according to claim 1, wherein the degassing treatment is conducted just before the step of forming the transparent electrode and the substrate is heated during the degassing treatment to a temperature which does not deform a material of the substrate and which is substantially higher than a temperature at which the substrate is heated in the formation of the transparent electrode.

3. A method of producing a liquid crystal display device according to claim 2, wherein the temperature at which the substrate is heated during the degassing treatment is 130° to 140° C. and the temperature at which the substrate is heated in the formation of the transparent electrode is 100° to 120° C.

4. A method of producing a liquid crystal display device according to claim 1, wherein the degassing treatment is conducted just before the sealing step by heating the substrate to a temperature which does not deform the material of the substrate and which can remove moisture in a vacuum atmosphere.

5. A method of producing a liquid crystal display device according to claim 4, wherein the degassing treatment is conducted by heating the substrate to 110° C. and then reducing the pressure.

6. A method of producing a liquid crystal display device according to claim 1, wherein a vacuum atmosphere in the degassing treatment is prepared just before the formation of the transparent electrodes.

7. A method of producing a liquid crystal display device comprising the steps of opposing two substrates, which are composed of a transparent electrode formed on a plastic substrate, with a specified space therebetween, sealing the circumferential ends of the substrates with a sealant so as to form a sealed space, and injecting a liquid crystal to the sealed space, wherein a degassing treatment is conducted by heating the liquid crystal display device before the injection of the liquid crystal in a vacuum atmosphere so as to release gas adsorbed on the surfaces of the substrates and sealant.

8. A method of producing a liquid crystal display device according to claim 7, wherein a jig for holding the sealed substrates from the outside is used to prevent the deformation of the sealed substrates in the degassing treatment.

* * * * *